June 23, 1953 M. L. HUREL 2,643,076
IMPROVEMENT IN AIRCRAFT OF HIGH ASPECT RATIO
Filed July 25, 1946 5 Sheets-Sheet 1
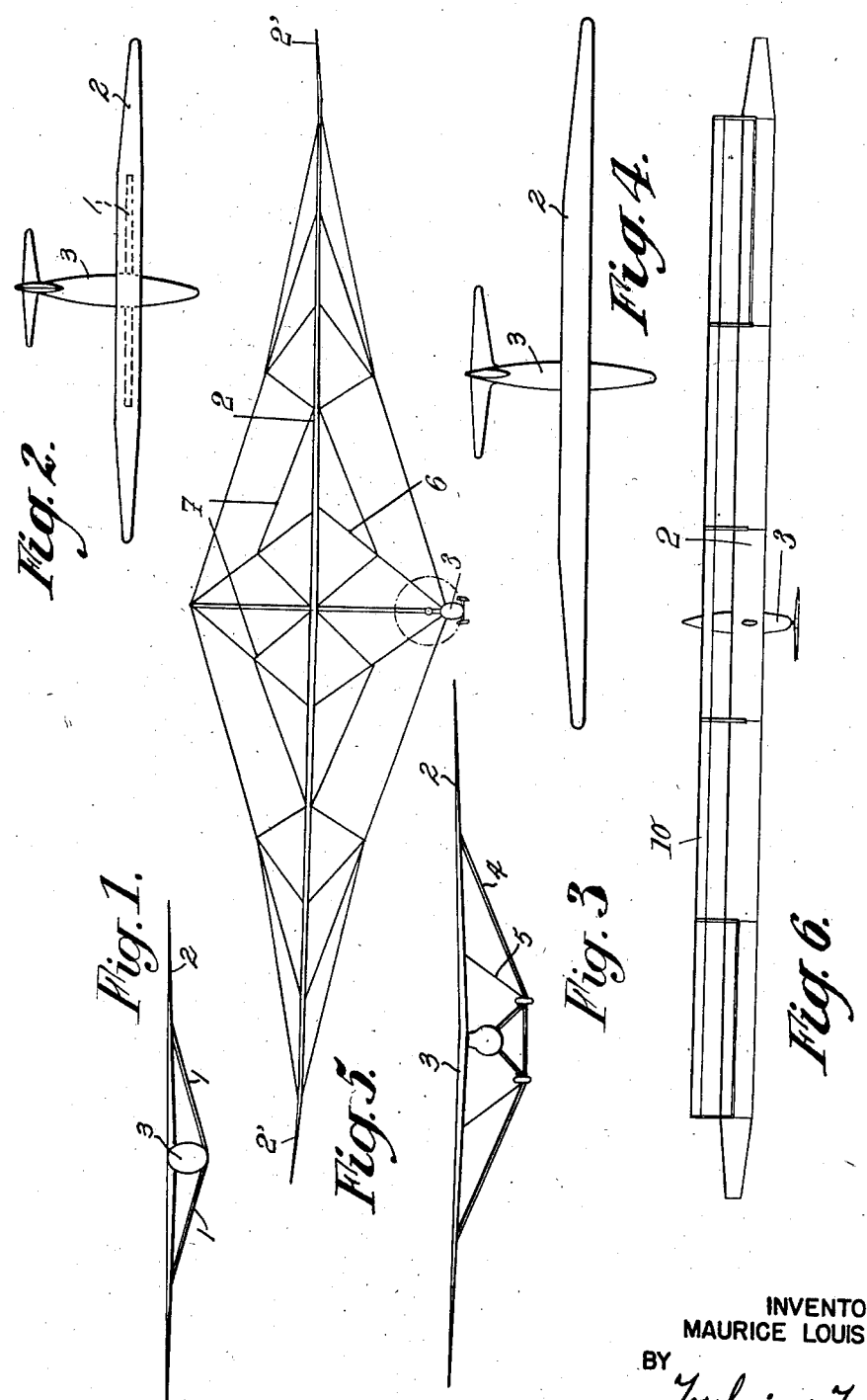
INVENTOR
MAURICE LOUIS HUREL
BY
Toulmin & Toulmin
ATTORNEYS

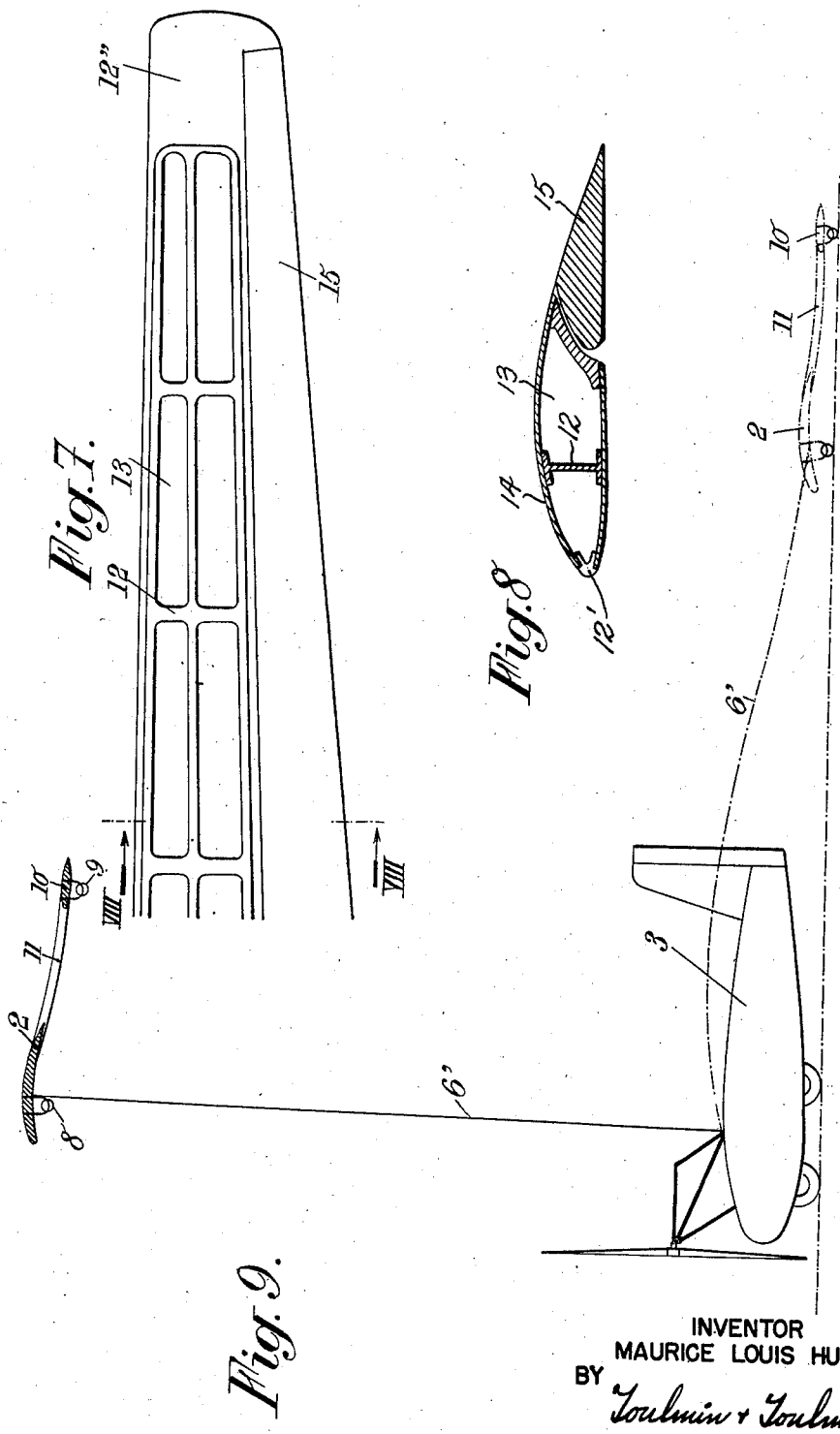

INVENTOR
MAURICE LOUIS HUREL
BY
Toulmin & Toulmin
ATTORNEYS

June 23, 1953  M. L. HUREL  2,643,076
IMPROVEMENT IN AIRCRAFT OF HIGH ASPECT RATIO
Filed July 25, 1946  5 Sheets-Sheet 4
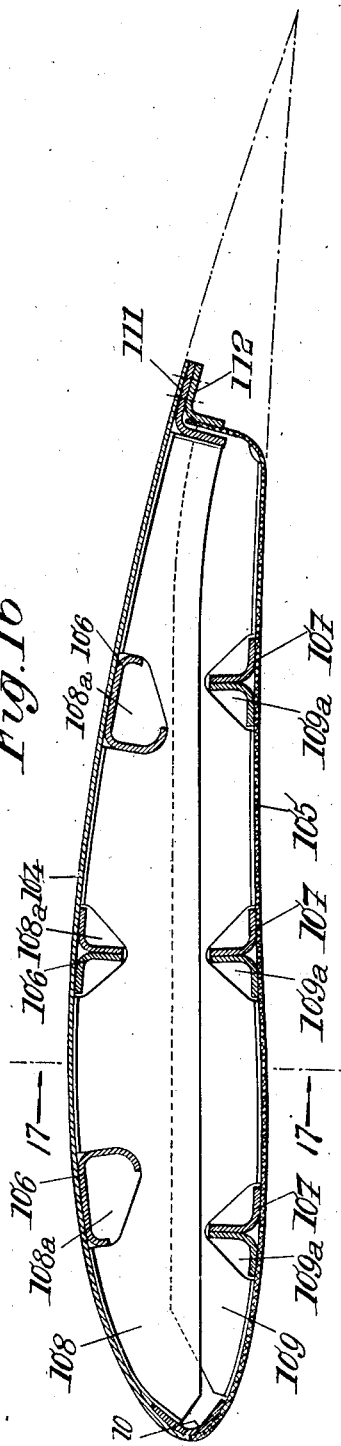
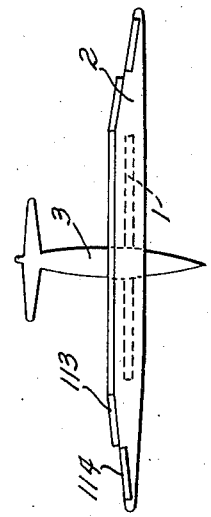
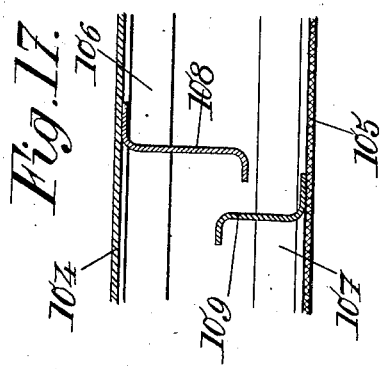
INVENTOR
MAURICE LOUIS HUREL
BY
Toulmin & Toulmin
ATTORNEYS June 23, 1953 — M. L. HUREL — 2,643,076
IMPROVEMENT IN AIRCRAFT OF HIGH ASPECT RATIO
Filed July 25, 1946 — 5 Sheets-Sheet 5
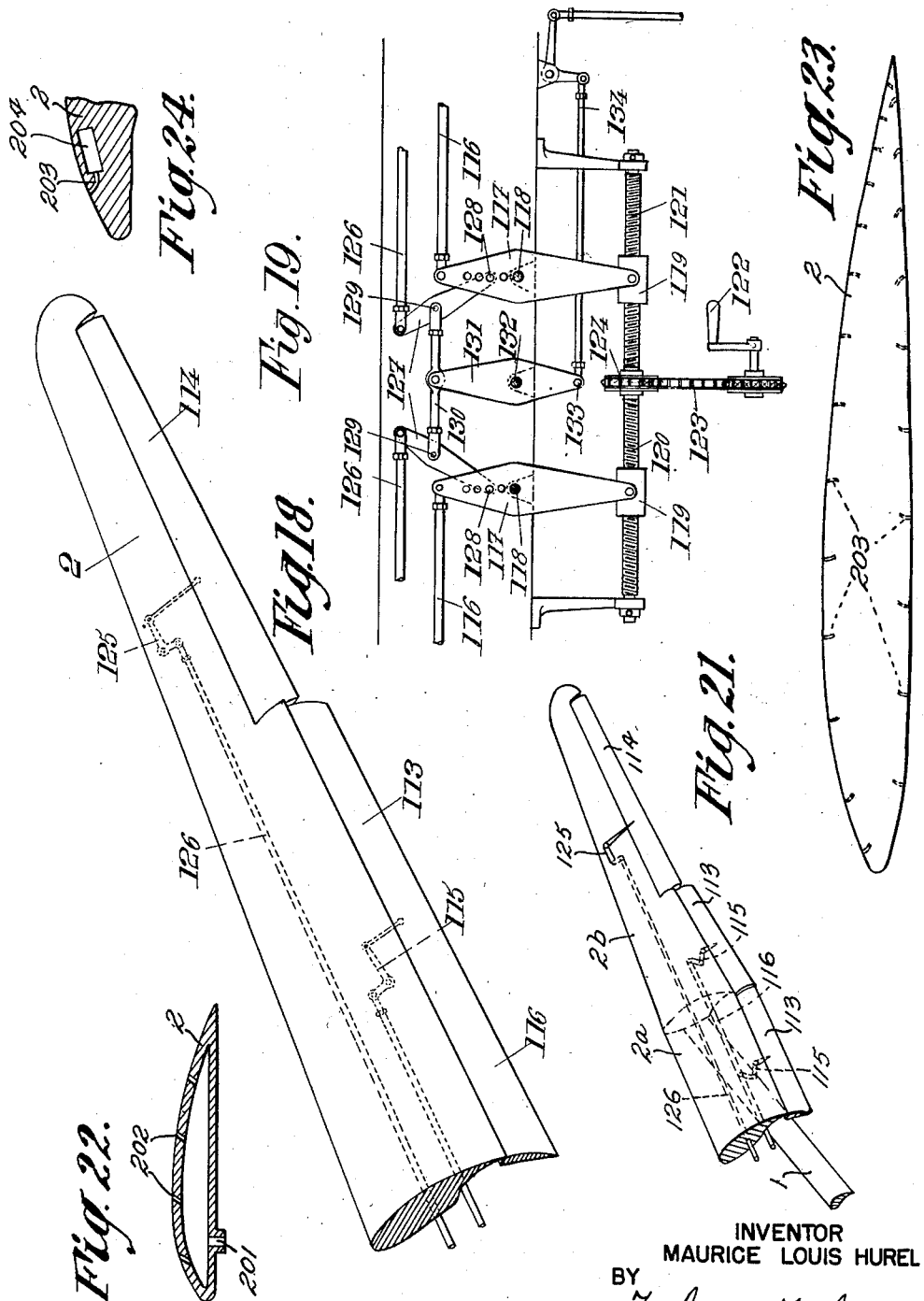
INVENTOR
MAURICE LOUIS HUREL
BY
Toulmin & Toulmin
ATTORNEYS Patented June 23, 1953

2,643,076

UNITED STATES PATENT OFFICE 2,643,076

IMPROVEMENT IN AIRCRAFT OF HIGH ASPECT RATIO

Maurice Louis Hurel, Deauville, France

Application July 25, 1946, Serial No. 686,081
In France September 5, 1945

9 Claims. (Cl. 244—13)

The invention relates to aircraft.

It is known that a substantial increase of the lift to drag ratio of an aerodyne and of the power coefficient thereof (i. e. the ratio of the cube of the lift coefficient to the square of the drag coefficient) can be obtained by increasing the geometric aspect ratio of the wing system of said aerodyne, since the induced drag decreases as the aspect ratio increases.

The chief object of my invention is to provide an aircraft having a geometrical aspect ratio $b^2/S$ ($b$ being the span and $S$ the total area of the wing system) higher than 15 and possibly equal to 30, 40 and even more for all flying conditions, including take off and landing.

With this object in view, according to an essential feature of my invention, a high aspect ratio as above mentioned is combined with at least one of the two features consisting, the first, in the use of a wing loading higher than 80 kg. per sq. m. and, the other, in the use of wing bracing means.

Preferred embodiments of my invention will be hereinafter described with reference to the accompanying drawings given merely by way of example, and in which:

Figs. 1 and 2 diagrammatically show, in front view and in plan view respectively, an airplane made according to a first embodiment of my invention;

Figs. 3 and 4 are similar views corresponding to a second embodiment;

Figs. 5 and 6 are similar views corresponding to a third embodiment;

Fig. 7 shows on a large scale the skeleton of a wing belonging to an airplane made according to my invention;

Fig. 8 is a section on the line VIII—VIII of Fig. 7, this skeleton being covered with reinforcing plates;

Fig. 9 shows a modification of the airplane shown by Figs. 5 and 6, the wing system being shown in two different positions;

Figure 10:
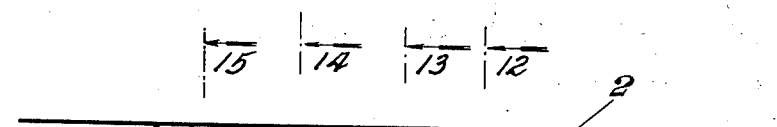
Fig. 10 is a front view showing a portion of an airplane of the type shown by Fig. 1.
Figure 11:
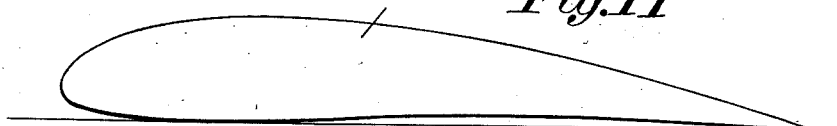
Fig. 11 is an elevational view of the wing of this airplane.

Figs. 12, 13, 14 and 15 show different sections, on the lines 12—12, 13—13, 14—14, and 15—15 of Fig. 10, respectively, of a wing bracing strut, in the respective positions they occupy with respect to the wing shown by Fig. 11;

Fig. 16 is a sectional view of a wing made according to the invention;

Fig. 17 is a section on the line 17—17 of Fig. 16;

Fig. 18 is a perspective view of a portion of a wing provided with a lift increase device;

Fig. 19 shows the means for controlling said device;

Figs. 20 and 21 are a top plan view and a perspective view respectively of an airplane embodying certain of the features of the preceding figures;

Fig. 22 shows in cross-section a wing embodying a blowing device;

Fig. 23 shows diagrammatically a wing embodying a suction device; and

Fig. 24 shows in cross-section a detail of the wing of Fig. 23.

In order to obtain an interesting value of the improvement in lift to drag ratio and power coefficient that results from the choice of a high geometrical aspect ratio, the angle of incidence of the wing system according to my invention should be given, for normal flying conditions, a high value corresponding to a lift coefficient, higher than 0.5, and possibly as high as 1, 1.2 or more.

The airfoil section camber will be advantageously chosen rather high, according to the utilization that is considered for the airplane. The best result will be obtained if the camber gives a minimum profile drag for a given useful lift. This camber may be as high as 8–10%. Furthermore, I preferably choose airfoil profiles of medium thickness (from 10 to 14%) and of substantial curvature. Among the airfoil profiles that seem to be particularly well adapted for use according to my invention is the Saint-Cyr 109 or the Sikorsky GS 1 airfoil profile. Such an airfoil will give, for a lift coefficient of 1 and an aspect ratio of 30, a lift to drag ratio of 47 and a power coefficient of 2000, whereas the usual values are respectively 25 and 400 for aspect ratios ranging from 6 to 8.

In some cases, in particular in that of small airplanes, it may be sufficient to combine with the high aspect ratio only the first of the two features above mentioned, to wit the application of a wing loading higher than 80 kg. per sq. m. Therefore, in this case, I make use of a cantilever wing. For instance, for an airplane weighing 280 kg., I may make use of a wing of an area of 2 sq. m. and of a span of 8 m. (that is to say having an aspect ratio of 32) of cantilever construction and weighing about 30 kg. In this case, the wing loading is equal to 140 kg. per sq. m. An ordinary wing, for an apparatus of the same total weight, would have an area of about 8 sq. m. and would weight about 40 kg. In other wing systems made according to the main feature of the invention, the wing loading may reach 200 kg. per sq. m. and even more.

Such reductions of the wing area, which correspond chiefly to a direction of the chord while normal wing spans are maintained, are made possible by the high efficiency of high aspect ratio wings, which permits of flying with a very low power.

In order to ensure a relatively low take off and landing speed of the aerodyne despite the reduction of area of its wing system, according to another feature of my invention, I provide the wing with a lift increase device, having a high lift coefficient (from 3 to 5 for instance) and a drag coefficient as low as possible.

It should be noted here that the high aspect ratio of the wing has a very advantageous influence upon the reduction of the drag produced by the lift increase device. This is due to the fact that most of the drag of wing systems fitted with lift increase devices is constituted by induced drag. If the lift increase device is fitted on a wing system of high aspect ratio, the induced drag is greatly reduced and the lift to drag ratio and power coefficient of this wing system may be normal, despite the presence of the lift increase device, which permits a low speed quick take off. For instance, a wing fitted with a lift increase device giving a lift coefficient of 4 and the corresponding profile drag coefficient of which is equal to 0.09, has, for an aspect ratio of 30, a total drag coefficient of 0.25, whereby its lift to drag ratio is equal to 16 and its power coefficient is equal to about 1000. If said lift increase device were fitted on a wing of an aspect ratio of 6, the value of the drag coefficient would have been 0.89 instead of 0.25.

It is pointed out that the fact that the wing area is reduced by modifying the chord while keeping the span at a normal value not only has for its effect to avoid an excessive weight but also permits of substantially increasing the maximum speed and the cruising speed of the airplane. Furthermore, it permits of reducing the area of the tail unit and the length of the fuselage, which involves a supplementary reduction of the head resistance and weight of the airplane.

In the case of bigger airplanes, or of small airplanes for which a high maximum or cruising speed is not particularly required, it is neecssary to provide the wing, according to the second feature above referred to, with bracing means adapted to reduce the bending stresses. Despite the supplementary drag produced by the bracing means, this arrangement is advantageous because this supplementary drag is very much smaller than the gain ensured, for high lift coefficients, by the high aspect ratio which involves a substantial reduction of the induced drag.

Of course, it is possible, even in the case of braced wings, to increase the wing loading for all the reasons above indicated, and it is of interest to proceed in this way when the only object is to obtain the maximum of ceiling and of lifting power without bothering about speed.

According to the embodiment shown by Figs. 1 and 2, I provide for instance two under side struts 1 between wing 2 and fuselage 3. If, for instance, the wing of this airplane has an area of 12 sq. m. and a span of 20 m., therefore an aspect ratio of 33, the $C_D$ of the two struts 1, each 4 m. long and 50 mm. thick will be about 0.002. In these conditions, the gain of $C_D$, with respect to a wing of an aspect ratio of 8, is 0.01 for a $C_L$ of 0.3, 0.04 for a $C_L$ of 1 and 0.0575 for a $C_L$ of 1.2.

The airplane shown by Fig. 1, supposed to be of the dimensions above indicated, can, with an engine of 500 H. P., be loaded to a weight of 3 tons. Its maximum speed will reach 400 km. per hour. Its ceiling will be 12,000 m. with a useful load of 800 kg. A power of 200 H. P. will be sufficient at ground level for flying at 220 km. per hour or a power of 160 H. P. for flying at 360 km. per hour at an altitude of 10,000 m. This power will be easily supplied by the engine if it is provided with a compressor restoring the power of 500 H. P. at an altitude of 5,000 m.

Figs. 3 and 4 show an airplane the wing of which has a span of 60 m. and an area of 100 m.$^2$ (aspect ratio equal to 36). The load may be from 5 to about 30 tons. The wing is supported by a main strut system 4 which supplies a portion of the lift.

This arrangement is the more interesting as the deflection due to the main wing is about inversely proportional to the aspect ratio, therefore very low. The $C_D$ resulting from the $C_L$ of the strut system is therefore very low, and the lift to drag ratio of the whole may be practically equal to that of the wing.

(The same remark applies to the tail unit and to tandem wings.)

The wing in question is, further, held by a pair of intermediate struts 5.

This machine, powered with an engine of 1300 H. P. fitted with a turbo-compressor and a mechanical compressor, can climb to 20,000 m. with two passengers and a photographic outfit. The power that is utilized at this altitude is 240 H. P., for a speed of 300 km. per hour and a weight of 5 tons.

Powered with engines of a total power of 3000 H. P. and loaded with 25 tons, it can carry 12 tons of useful load to a distance of 1200 km., 10 tons to 4000 km., and 7 tons to a distance ranging from 5000 to 6000 km. The power necessary for flight at the take off is only 780 H. P. With 3 tons of useful load, it can remain in the air more than three days at an average speed of 200 km. per hour.

These examples have no limitative character and the various bracing arrangements usually employed may be applied to high aspect ratio wings, including multiplane systems. It is reminded that, in this case, the factors to consider, to determine the aspect ratio, $b^2/S$, are the span of the wing having the maximum span and the total area of the wing system.

Figs. 5 and 6 show a man powered aircraft made according to the invention, this aircraft has a wing 2 of a span of 46 m.; the wing is supported by lower bracing means 6 and upper bracing means 7 divided into ten sections of a span of 4 m., two cantilever sections of a span of 3 m. being provided at each end of the wing.

The $C_D$ of the bracing means the total length of which is equal to about 200 m. and the mean thickness of which is equal to 0.3 mm., has a value of 0.005. This machine weighs for instance 50 kg. unloaded and 125 kg. loaded. At a speed of 5 m. per second, it requires only 18 kgm. per sec. for flying at ground level, that is to say a power that can easily be supplied by man for several hours.

According to a modification of this man powered aircraft, the upper bracing means and the upper strut are to be dispensed with, and the fuselage is suspended by flexible bracing means 6' under the wing 2 (Fig. 9). In this case, it is necessary to fit the wing with a landing and take off gear capable of enabling it to run on the ground during the landing and take off operations; this gear is indicated in Fig. 9 at 8 and 9. When taking off, wing 2 is pulled by fuselage 1 like a kite (see the position of wing indicated in dotted lines), leaves the ground when its lift exceeds its weight and comes slightly behind the vertical of the fuselage (see the position of wing indicated in solid lines by Fig. 9). When landing, the same operations take place in the reverse order.

In certain cases and as above indicated, the torsional stresses in the wing system may be supported by the bracing device if the latter can be strained in bending in its plane. In other cases, according to another feature of my invention, I provide a stabilizing plane 10 (Fig. 9) at the rear of the wing; this plane, which is carried by the wing itself, may extend over the whole or a portion of the span thereof and may be either continuous or discontinuous. It may include either only a movable part or a fixed part, or both a fixed part and a movable part. The object of this plane is to stabilize the portion of the wing behind which it is placed, by directly compensating for the torsional stresses that result from displacements of the center of pressures as a function of the incidence, instead of causing these stresses to be transmitted, as usual, to the central portion of the wing and the fuselage.

The movement of the movable part of the stabilizing plane, if such a part exists, is intended to give, through the action of the pilot, a predetermined incidence to the portion of the wing behind which it is located, the balancing of the whole of the wing and the tail unit being thus ensured for the chosen incidence.

In the embodiments of Figs. 6 and 9, this stabilizing plane 10 is fixed to wing 2 by means of supports 11 the shape of which corresponds to the direction of the streamlined escapings from the trailing edge of this wing. Furthermore, as shown by Fig. 9, the distance between the trailing edge of wing 2 and the leading edge of stabilizing plane 10 may be substantially equal to the chord of said wing, while the chord of the stabilizing plane may be approximately equal to one half of the chord of the wing.

According to still another feature of my invention, the wing frame may be constituted by a single piece or by several sections juxtaposed in the direction of the span, and each made of a single piece. Each piece may be reinforced by metallic plates, constituting a portion of the wing covering or skin, and located at places where the compression or traction components of the bending stresses are maximum. These pieces may be either solid or hollowed out, made of wood or of a moulded material, or of a light or extra-light metal or alloy, while the reinforcement plates are preferably of Duralumin or steel and are located on the outer and/or inner face of the wing, where the stresses are maximum. These plates may be fixed to the piece or pieces that form the wing frame in any suitable manner, for instance by nailing, screwing, riveting, glueing, welding, etc.

A particularly advantageous embodiment of this wing construction is shown by Figs. 7 and 8. The wing frame 12, which determines the airfoil profile, is made of a single piece, for instance of wood. It is hollowed out at 13 to reduce its weight.

The wing skin is constituted by the surface of said frame 12 itself over all the portions of the wing where the shape is complicated, for instance at the leading edge or at the trailing edge or at the wing tips 12'', where the stresses are small. On the contrary, Duralumin or steel reinforcement plates 14 constitute the covering of most of the upper and under sides of the wing, the ribs formed by frame 12 across said hollows 13 serving to prevent warping of said plates.

It should further be noted that frame 12 supports most of the efforts in the plane of the wing, cooperates in the resistance to torsion and supports all the local stresses external to the wing, such as those produced by fixation to the fuselage, strut fixations, front slot supports if they exist and rear flap supports.

When the frame is constituted by several sections, each made of a single piece, juxtaposed in the direction of the wing span, it is advantageous to provide a certain clearance between two adjacent pieces, in order thus to avoid the excessive stresses that might otherwise be produced by expansion due to temperature variations or elastic elongation of the reinforcement plates. Of course, despite these slots, the frame may perfectly well play the part it has been given.

In airplanes including a wing braced by means of struts, for instance as shown by Fig. 10, and especially when the wing aspect ratio is chosen above 15, in order to have, for the incidences that are considered, the best possible total efficiency of said wing and strut systems, the total lift thereof should be distributed in the best possible manner along the span, and in particular it should be equivalent to that obtained with a wing of elliptic outline in plan view.

According to a feature of my invention, I arrange the strut system to ensure the desired variation of lift along the span whereas the portion of the wing between the fixations of struts 1 thereto is given a substantially uniform profile, chord and incidence over its whole span.

In order to avoid a discontinuity in the distribution of the lift at the points of junction of struts 1 with wing 2, the lift of the strut sections located close to said points of junction must be made at least approximately equal to zero, and this whatever be the incidence of the wing with respect to the velocity vector.

In some cases, it suffices, in order to ensure the desired distribution of the total lift, to give the strut sections a uniform direction and depth such that the lift of the sections located near the points of junction with the wing is zero, whatever be the incidence, due to the deviation undergone by the airstream in the vicinity of the wing, whereas the strut sections of the same direction and the same depth but located at a greater distance from these points of junction supply a certain lift which constitutes the desired complement of lift.

However, in most cases, the complement of lift thus obtained is insufficient for ensuring the optimum distribution of the lift. Therefore, it will be necessary to have recourse to other suitable means.

For instance, the incidence of the strut sections varies along said struts, so that the angle made by a strut section with the corresponding wing section is the greater as said strut section is more distant from the point of junction of the strut with the wing.

In the embodiment of my invention shown by

Figs. 10 to 15, I make use of struts 1 of variable incidence and uniform chord.

According to Figs. 12 to 15, which represent, merely by way of indication, the directions of various sections of strut 1, the section which is located in close vicinity to fuselage 3 (Fig. 3) has an angle of incidence equal to zero, whereas the section that is located in close vicinity to the junction with wing 1 (Fig. 3) has an angle of incidence equal to —2°, the angle of incidence varying gradually so as to pass through values —0.40° (Fig. 5) and —1.20° (Fig. 4).

According to another feature of my invention, the strut sections that are close to the point of junction of each strut with the wing are given a shape and an incidence such that the mean line of these strut sections conforms as well as possible with the airstream in the vicinity of said point of junction, account being taken of the deflection caused by the thickness of the wing. Furthermore, the strut sections are advantageously given, close to the wing, a thickness as small as permitted by the strength of the materials, for instance equal to, or smaller than, 8% of the chord of the strut section.

Thus, near the point of junction of each of the struts with the wing, the face of the strut that is facing the wing is approximately parallel to the portion of the wing under side close to which it is located, which involves a substantial reduction of the drag. The strut sections at a greater distance from the point of junction with the wing may have a greater thickness.

Figure 12:
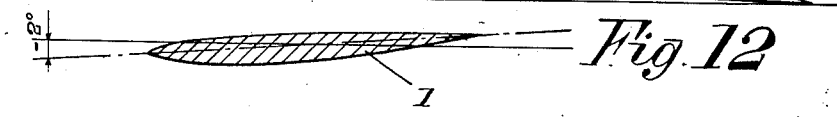
Figure 13:
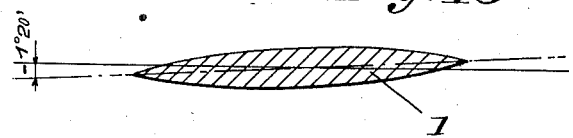
Figure 14:
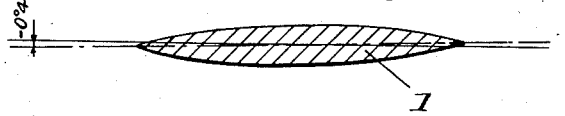
Figure 15:
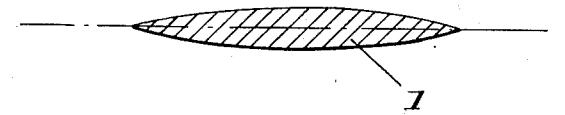

Preferably the sections of the struts located near the points of junction with the wing are given an airfoil profile having an upwardly concave mean line (see Fig. 12). On the contrary, the strut sections that are at a greater distance from the point of junction of the strut with the wing may be given a symmetrical shape (see Fig. 15) or an upwardly convex shape. In this case, the profile preferably changes gradually along the strut.

According to still another feature of my invention, I ensure a suitable distribution along the span of the lift of a high aspect ratio wing (15 or more) by combining with said wing a lift increase device and extending preferably over the whole span of the wing, said device being of the kind of those that have a relatively low profile drag.

I thus obtain not only a low take off and landing speed, despite the use of high wing loadings, but also the possibility of taking off, climbing and flying with the lowest possible power, the lift increase device being utilized either fully or partly.

An example of construction that seems particularly advantageous is shown by Figs. 18 and 19. According to this embodiment, I make use of flaps 113 of the Fowler type (see Fig. 18) especially studied for the wing profile that is utilized and which is chosen for its lower profile drag ($C_{D0}=0.02$ approximately) for lift coefficients of about 2 or 2.5.

It should be reminded here that Fowler flaps are guided by slideways (not shown in the drawings) by means of which they are given combined pivoting and rearward displacements.

The Fowler flaps may occupy about ¾ of the span of the wing, whereas the remainder of the span is occupied by ailerons 114 which are pivoted downwardly together with the flaps. However the mean pivoting angle of the ailerons is smaller than that of the flaps. The difference between these angles is chosen such as to permit of obtaining, along the wing, in the direction of its span, a suitable distribution of the lift. The ratio of the angular displacement of the flaps to that of the ailerons may be for instance such that, for a pivoting of about 20° of the flaps, the mean pivoting of the ailerons is about 12°.

I can thus obtain that, for instance for a lift coefficient of 2, a geometrical aspect ratio of 30, the total drag coefficient of the wing is only about 0.06, which gives a lift to drag ratio of about 33 and a power coefficient of 2000, thus permitting take off, climbing, and flying with one or several engines stopped, with a low power. By pivoting the flaps to 40° or more, the lift coefficient can, as on airplanes fitted with a lift increase device of the usual type, be raised to values as high as 3 and even more.

In order to obtain the simultaneous pivoting of flaps 13 and ailerons 14, I make use, for instance, of the control system shown by Figs. 18 and 19.

According to these figures, the cranks 115 which control both the pivoting and the sliding movement of flaps 113 are connected through links 116 with one of the ends of levers 117 pivoted about axes 118 and hinged at their outer ends on a nut 119. The two nuts 119 of the two levers 117 coact with a right and left screw 120—121, driven, for instance, by a crank 122, through the intermediate of a chain 123 and a common pinion 124.

Rotation of crank 122 causes levers 117 to pivot in opposed directions, thus pivoting flaps 113 located on either side of the plane of symmetry of the aerodyne, in the same direction and through the same angle.

As for ailerons 114, their cranks 125 are each connected, through a link 126, with one of the ends of a lever 127 the other end of which is pivoted at 128 to the lever 117 of the corresponding flap 113, at a point located between the pivot axis 118 of this lever 117 and the hinge provided between the corresponding link 116 and said lever 117.

Furthermore, levers 127 are pivoted at 129 to the respective ends of an equalizer bar 130 carried, at its middle point, by one of the ends of a lever 131 pivoted about an axis 132 and the other end 133 of which is hinged to a control rod 134.

By moving said rod 134, when levers 117 remain stationary, I cause the ailerons to pivot in opposite directions respectively. Rod 134 therefore belongs to the banking control means. On the contrary, by operating crank 122, I cause levers 127 to pivot in opposite directions about their axis 129, which produces the pivoting of the ailerons both in the same direction. However, through a suitable choice of the positioning of the axes 128 about which levers 127 are pivoted to levers 117, I adjust the ratio of the pivoting displacements of airlerons 114 to those of flaps 113, so as to obtain, at least approximately, the desired distribution of the lift along the span of the wing.

According to still another feature of my invention, the wing is constituted by two independent shells 104 and 105, one forming the upper side of the wing and the other the under side thereof, these shells being assembled together merely through their skin at the front and at the rear. According to my invention, each of these shells is essentially constituted by its skin, which determines the outer shape of the shell, by stringers 106, 107 running parallel to the span on the inside of the wing, said stringers stiffening the skin so as to cooperate therewith in resisting vertical bending stresses, and finally by ribs 108 (for the shell that forms the wing upper side) and 109 (for the shell that forms the wing under side) substantially perpendicular to the stringers, and keeping the desired streamlined shape.

Stringers 106 and 107 may have various sections, for instance those shown by Fig. 16. Concerning ribs 108 and 109, they are preferably of Z-shaped section (Fig. 17) and they are provided with notches 108a, 109a at the place where they cross the stringers belonging to the same shell, the shape of these notches corresponding to that of the section of the stringers that cross them. Preferably, in order to be able to make each rib of a height as great as possible, they are disposed in such manner, in each of the corresponding shells, that after assembly, the ribs of one of the shells come between the ribs of the other so that in lateral projection in the direction of the wing span, they can partly overlap one another (see Figs. 16 and 17).

Whatever be the disposition or arrangement of ribs 108, 109, they are not directly connected to one another. The assembly of the two shells is ensured, as above stated, only by their skins at the front and at the rear of the wing, through any suitable means, for instance, by welding, by screwed bolts, by rivets, etc.

According to a preferred embodiment, I fix the front edges of the two shells to a reinforcing element 110 of gutter-shaped section which serves both to assemble the two shells at the front part of the wing, and to reinforce the leading edge thereof.

For the assembly of the two shells at the rear of the wing, I preferably make use of two angle irons 111, 112, secured together through their rearwardly extending wings by means of rivets, by welding, etc. and fixed one to the rear edge of the shell that forms the wing upper side and the other to the rear edge of the wing that forms the wing under side.

When the shells are assembled by riveting or welding, I preferably begin by the leading edge, while moving the two shells slightly away from each other at the rear, so as to permit of introducing between the two shells the riveting block or the electrode of the welding machine.

The construction of the above described wing is particularly easy to carry out in the case of high aspect ratio wing systems. As a matter of fact, in these wing systems, the bending stresses are relatively high as compared with the shearing or torsional stresses. Due to the high bending stresses, it is necessary to constitute the skin by relatively thick metal sheets which may then easily resist, either alone or with a continuous reinforcement, the shearing and torsional stresses.

Figs. 20 and 21 show an airplane having a central wing section 2a of uniform chord and tapered end wing sections 2b. The wing is provided with a strut 1, such as is shown in Figs. 10 to 15, which joins the wing at the dividing line between the outer and inner sections. The wing is also provided with a high lift device 113 and ailerons 114, such as is shown in Fig. 18, and which may be controlled by the mechanism of Fig. 19.

According to still another advantageous embodiment of the third feature in question, I make use, as lift increase device extending at least approximately over the whole span of the wing, of a suction and/or blowing device, which can be controlled, near the wing tips, in such manner as to play the part of ailerons.

I vary the intensity of the suction or of the blowing action in such manner as at least approximately to obtain a given distribution of lift along the span of the wing. By combining this lift increase device which is also characterized by a very reduced profile drag coefficient with aspect ratios of 30 or more, it is possible to obtain extremely high lift to drag ratio and power coefficients, even when the power spent for suction and/or blowing is taken into account.

Fig. 22 shows a wing of this type in which a blowing device is used. The wing is hollow and is provided with slots 202 and gas under pressure is fed to the wing through an inlet 201.

Figs. 23 and 24 show a suction type of high lift device. The wing 2 is provided with a plurality of suction ducts 204 which communicate with slots 203 opening into the wing surface.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An airplane which comprises, in combination, a wing with two spans, a fuselage centrally of said spans, and bracing struts connected to the fuselage and to points on the wing nearer to the center of each span than to the root and tip thereof, each bracing strut having a substantial lift effect throughout substantially its whole length, and being of substantial chord but less than the wing chord, said wing and struts having a combined aspect ratio of at least 15 and a loading of at least 80 kg. per sq. m., the portion of the wing between the points of junction of the struts with the wing being of uniform section and incidence and the portions of the wing beyond such points decreasing in chord, and the struts decreasing continuously in incidence from the fuselage to the wing so as to give a continuously varying distribution of the lift over the portion of the span between the junction points.

2. An airplane which comprises, in combination, a wing with two spans, a fuselage centrally of said wing, and bracing struts connected to the fuselage and to points on the wing nearer to the center of each span than to the root and tip thereof, each bracing strut having a substantial lift effect throughout substantially its whole length, and being of substantial chord but less than the wing chord, said wing and struts having a combined aspect ratio of at least 15 and a loading of at least 80 kg. per sq. m., the portion of the wing between the points of junction of the struts with the wing being of uniform section and incidence and the portions of the wing beyond such points decreasing in chord, and the struts decreasing continuously in thickness from the fuselage to the wing so as to give a continuously varying distribution of the lift over the portion of the span between the junction points.

3. An airplane which comprises, in combination, a wing with two spans, a fuselage centrally of said spans, and bracing struts connected to the fuselage and to points on the wing nearer to the center of each span than to the root and tip thereof, each bracing strut having a substantial lift effect throughout substantially its whole length, and being of substantial chord but less than the wing chord, said wing and struts having a combined aspect ratio of at least 15 and a loading of at least 80 kg. per sq. m., the portion of the wing between the points of junction of the struts with the wing being of uniform section and incidence and the portions of the wing beyond such points decreasing in chord, and the struts decreasing continuously in thickness and incidence from the fuselage to the wing so as to give a continuously varying distribution of the lift over the portion of the span between the junction points.

4. An airplane which comprises, in combination, a wing with two spans, a fuselage centrally of said spans, and bracing struts connected to the fuselage and to points on the wing nearer to the center of each span than to the root and tip thereof, each bracing strut having a substantial lift effect in level flight throughout substantially its whole length, high lift devices of low drag coefficient mounted on each span of the wing, means joined to said devices for controlling both of said devices simultaneously in the same direction, said wing, struts, and high lift devices in active position having a combined aspect ratio of at least 15 and a loading of at least 80 kg. per sq. m.

5. An airplane which comprises, in combination, a wing with two spans, a fuselage centrally of said spans, and bracing struts connected to the fuselage and to points on the wing nearer to the center of each span than to the root and tip thereof, each bracing strut having a substantial lift effect in level flight throughout substantially its whole length, an aileron and a high lift means of low drag coefficient attached to each span of the wing, means joined to said ailerons for moving them simultaneously in opposite directions, means joined to said high lift devices for controlling both of said devices simultaneously in the same direction, said wing, struts, ailerons and high lift devices in active position having a combined aspect ratio of at least 15 and a loading of at least 80 kg. per sq. m.

6. An airplane which comprises, in combination, a wing with two spans, a fuselage centrally of said spans, and bracing struts connected to the fuselage and to points on the wing nearer to the center of each span than to the root and tip thereof, each bracing strut having a substantial lift effect in level flight throughout substantially its whole length, high lift devices of low drag coefficient comprising Fowler flaps mounted on each span of the wing and extending along 75% of the span of the wing, means joined to said devices for operating both of said devices simultaneously in the same direction, said wing, struts and high lift devices in active position having a combined aspect ratio of at least 15 and a loading of at least 80 kg. per sq. m.

7. An airplane which comprises, in combination, a wing with two spans, a fuselage centrally of said spans, and bracing struts connected to the fuselage and to points on the wing nearer to the center of each span than to the root and tip thereof, each bracing strut having a substantial lift effect in level flight throughout substantially its whole length, high lift devices of low drag coefficient comprising each a Fowler flap mounted on each span of the wing, means joined to said devices for operating both of said devices simultaneously in the same direction, said wing, struts and high lift devices in active position having a combined aspect ratio of at least 15 and a loading of at least 80 kg. per sq. m.

8. An airplane which comprises, in combination, a wing with two spans, a fuselage centrally of said spans, and bracing struts connected to the fuselage and to points on the wing nearer to the center of each span than to the root and tip thereof, each bracing strut having a substantial lift effect in level flight throughout substantially its whole length, high lift devices of low drag coefficient comprising adjustable flaps at the trailing edge of the wing mounted on each span of the wing, means joined to said devices for operating both of said devices simultaneously in the same direction, said wing, struts and high lift devices in active position having a combined aspect ratio of at least 15 and a loading of at least 80 kg. per sq. m.

9. An airplane which comprises, in combination, a wing with two spans, a fuselage centrally of said spans, and bracing struts connected to the fuselage and to points on the wing nearer to the center of each span than to the root and tip thereof, each bracing strut having a substantial lift effect in level flight throughout substantially its whole length, an aileron and a high lift device of low drag coefficient comprising adjustable flaps at the trailing edge of the wing attached to each span of the wing, means joined to said ailerons for moving the ailerons simultaneously in opposite directions, means joined to said devices for operating the high lift devices simultaneously in the same direction, said wing, struts, ailerons and high lift device in active position having a combined aspect ratio of at least 15 and a loading of at least 80 kg. per sq. m.

MAURICE LOUIS HUREL.

References Cited in the file of this patent

UNITED STATES PATENTS

| Number | Name | Date |
|---|---|---|
| 1,259,083 | Covino | Mar. 12, 1918 |
| 1,559,090 | Hall | Oct. 27, 1925 |
| 1,656,193 | Hall | Jan. 17, 1928 |
| 1,670,852 | Fowler | May 22, 1928 |
| 1,779,842 | Gerhardt | Oct. 28, 1930 |
| 1,861,901 | Bellanca | June 7, 1932 |
| 2,090,775 | Wright | Aug. 24, 1937 |
| 2,135,096 | Bellanca | Nov. 1, 1938 |

FOREIGN PATENTS

| Number | Country | Date |
|---|---|---|
| 627,771 | Germany | Mar. 24, 1936 |

OTHER REFERENCES

"Flight," March 18, 1937, 268a–268c; copy in Division 22.

Warner "Airplane Design Aerodynamics," 1st edition (pages 98 and 99; copy in Div. 22).